United States Patent
Roux et al.

(10) Patent No.: US 12,254,378 B2
(45) Date of Patent: *Mar. 18, 2025

(54) QUICK RESPONSE (QR) CODE BASED TEST DATA EMBEDDING AND TRANSMISSION

(71) Applicant: VIAVI SOLUTIONS INC., Chandler, AZ (US)

(72) Inventors: Charlène Roux, Chamboeuf (FR); Pascal Donzel, La Talaudière (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,406

(22) Filed: Jun. 22, 2023

(65) Prior Publication Data
US 2023/0342577 A1  Oct. 26, 2023

Related U.S. Application Data

(63) Continuation of application No. 17/504,251, filed on Oct. 18, 2021, now Pat. No. 11,720,765, which is a
(Continued)

(30) Foreign Application Priority Data

Mar. 27, 2020  (EP) .................................. 20315064

(51) Int. Cl.
*G06K 7/14* (2006.01)
*G06K 19/06* (2006.01)
*H04L 9/32* (2006.01)

(52) U.S. Cl.
CPC ..... *G06K 7/1417* (2013.01); *G06K 19/06037* (2013.01); *H04L 9/32* (2013.01)

(58) Field of Classification Search
CPC ... G06K 7/1417; G06K 19/06037; H04L 9/32
(Continued)

(56) References Cited

U.S. PATENT DOCUMENTS 6,456,370 B1  9/2002  Ingles et al.
9,430,576 B2 *  8/2016  Terwilliger ............ G06Q 10/00
(Continued)

FOREIGN PATENT DOCUMENTS

DE  102014112033 A1  2/2016
EP  3136242 A1  3/2017
WO  2013046231 A1  4/2013

*Primary Examiner* — Ahshik Kim
(74) *Attorney, Agent, or Firm* — Mannava & Kang, P.C.

(57) ABSTRACT

In some examples, QR code based test data embedding and transmission may include obtaining, by a test data analyzer that is executed by at least one hardware processor, test data based on operation of a test device to measure a parameter associated with an optical fiber. Based on an analysis of the test data, a report that includes the test data may be generated. A quick response (QR) code generator that is executed by the at least one hardware processor may compress the report that includes the test data to generate a compressed report. The QR code generator may generate, based on an analysis of the compressed report, a QR code that includes the compressed report. A display generator that is executed by the at least one hardware processor may generate a display of the QR code that includes the compressed report.

20 Claims, 14 Drawing Sheets

Related U.S. Application Data continuation of application No. 16/923,735, filed on Jul. 8, 2020, now Pat. No. 11,176,343.

(58) Field of Classification Search
USPC .................................................... 235/462.1
See application file for complete search history.

(56) References Cited

U.S. PATENT DOCUMENTS

| | | |
|---|---|---|
| 10,101,240 B1 | 10/2018 | Bonche et al. |
| 10,678,621 B2 * | 6/2020 | Thompson .......... G06F 21/6245 |
| 10,914,655 B2 | 2/2021 | Roux et al. |
| 11,176,343 B2 * | 11/2021 | Roux ................... G06K 7/1417 |
| 2005/0259242 A1 | 11/2005 | Bridge et al. |
| 2008/0106731 A1 | 5/2008 | Iwasaki |
| 2013/0258832 A1 | 10/2013 | Serr et al. |
| 2014/0107976 A1 | 4/2014 | Kallfelz et al. |
| 2014/0129882 A1 | 5/2014 | Harden et al. |
| 2020/0106522 A1 | 4/2020 | D'Errico et al. |
| 2020/0336218 A1 | 10/2020 | Hassan et al. |

\* cited by examiner

110

[Header]
Txt File Release    1.2
Date              18/03/2020
Time              12:02
Module Name       4138 FMA365FCO
Status            NO TEST
Technician Id
Job Id
Comment

[Fiber]                         602
Fiber Number       1
Location A         Loc A
Location B         Loc B
Direction          Loc A -> Loc B
Cable Id Location A    Cable
Fiber Id Location A    Fiber

[Alarms]
None

[Results]
 Wavel      Power     Relative    Refer     Mode      Comp.
 Min. th    Max. th   Status
  nm        dBm       dB    dBm             dB   dBm       dBm 1550     -11.80            Auto    +0.00    -60       +40
           NO TEST <Metadata>                600
   <Verdict>None</Verdict>
   <Workorder></Workorder>
   <TestLocation>Loc A</TestLocation>
   <TestLocationB>Loc B</TestLocationB>
   <TestDirection>A-B</TestDirection>
   <Comments></Comments>
   <AcqDate>18/03/2020 12:02:10</AcqDate>
   <FiberNumber>1</FiberNumber>
   <FiberId>Fiber</FiberId>
   <CableId>Cable</CableId>
</Metadata>

OBTAIN, BY AT LEAST ONE HARDWARE PROCESSOR, TEST DATA BASED ON OPERATION OF A TEST DEVICE TO MEASURE A PARAMETER ASSOCIATED WITH AN OPTICAL FIBER
902

↓

GENERATE, BY THE AT LEAST ONE HARDWARE PROCESSOR, BASED ON AN ANALYSIS OF THE TEST DATA, A REPORT THAT INCLUDES THE TEST DATA
904

↓

GENERATE, BY THE AT LEAST ONE HARDWARE PROCESSOR, BASED ON AN ANALYSIS OF THE REPORT, A QUICK RESPONSE (QR) CODE THAT INCLUDES THE REPORT
906

↓

GENERATE, BY THE AT LEAST ONE HARDWARE PROCESSOR, A DISPLAY OF THE QR CODE THAT INCLUDES THE REPORT
908

*FIG. 9*

QUICK RESPONSE (QR) CODE BASED TEST DATA EMBEDDING AND TRANSMISSION

PRIORITY

This application is a Continuation of commonly assigned and co-pending U.S. application Ser. No. 17/504,251, filed on Oct. 18, 2021, which is a Continuation of commonly assigned U.S. application Ser. No. 16/923,735, filed on Jul. 8, 2020, now U.S. Pat. No. 11,176,343, which claims priority under 35 U.S.C. 119 (a)-(d) to European patent application number 20315064.4, having a filing date of Mar. 27, 2020, the disclosures of which are hereby incorporated by reference in their entireties.

BACKGROUND

A test device such as a power meter, an optical time domain reflectometer (OTDR), and other such test devices may utilize a variety of techniques to ascertain data. For example, an OTDR may characterize an optical fiber by injecting a series of optical pulses into the optical fiber. The OTDR may extract light that is scattered or reflected back from different points along the optical fiber. The scattered or reflected light may be utilized to characterize the optical fiber. Data associated with the characterization of the optical fiber may be transmitted to a variety of sources. For example, the data may be transmitted to a smartphone, a tablet, a laptop, and other such devices, or via a mobile device to a data management system situated in the cloud.

BRIEF DESCRIPTION OF DRAWINGS

Features of the present disclosure are illustrated by way of example and not limited in the following figure(s), in which like numerals indicate like elements, in which:

FIGS. 6A and 6B illustrate an example of operation of the QR code based test data embedding and transmission system of FIG. 1 for a power meter in accordance with an example of the present disclosure;

FIG. 9 illustrates a flowchart of an example method for QR code based test data embedding and transmission in accordance with an example of the present disclosure.

DETAILED DESCRIPTION

Figure 1:
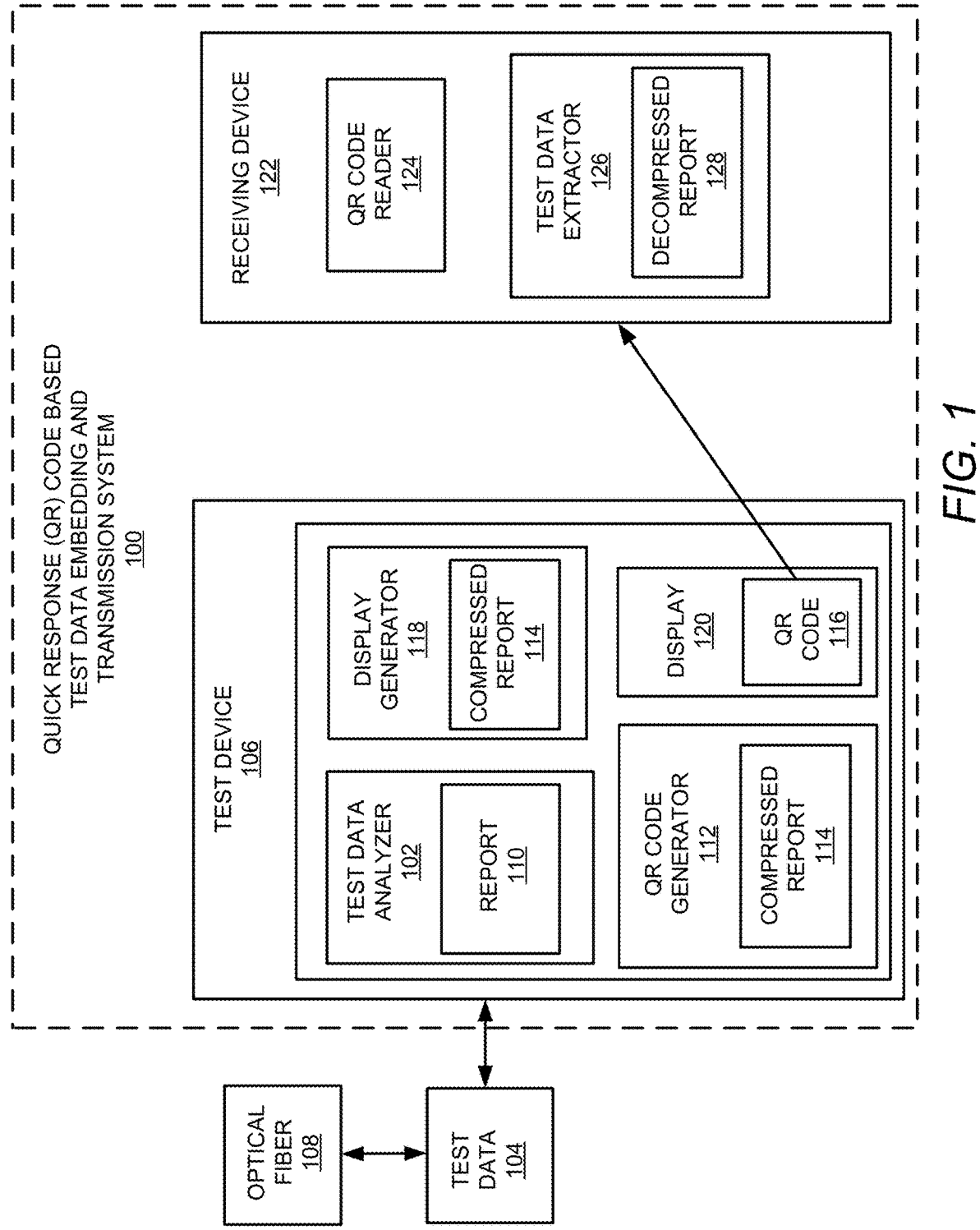
FIG. 1 illustrates an architectural layout of a quick response (QR) code based test data embedding and transmission system in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

QR code based test data embedding and transmission systems, methods for QR code based test data embedding and transmission, and non-transitory computer readable media for QR code based test data embedding and transmission are disclosed herein. The systems, methods, and non-transitory computer readable media disclosed herein provide for measurement of values such as power, distance, loss, etc. by a test device, and generation of test results by the test device, such as a power meter, an OTDR, etc. According to examples disclosed herein, the systems, methods, and non-transitory computer readable media may be implemented in or include a test device that may generate a QR code, and include the test results in the QR code. For example, the test results may be compressed and encrypted for inclusion in the QR code. According to examples disclosed herein, the systems, methods, and non-transitory computer readable media may be implemented in or include a receiving device such as a phone, tablet, etc., that may read the QR code, decompress and decrypt the test results, and the test results may be transmitted or otherwise utilized as needed. According to examples disclosed herein, the systems, methods, and non-transitory computer readable media disclosed herein may provide for secure and efficient transmission of test data from a test device to other devices.

Test devices such as power meters, OTDRs, and other such test devices may utilize a variety of techniques to ascertain data (e.g., test data), and to transmit the test data to a receiving device. For example, in order to transmit the test data from a test device to a receiving device, a wired or wireless connection may be implemented by the test device to communicate with the receiving device such as a smart phone, a tablet, a laptop, etc. In this regard, in some cases, it is technically challenging to implement a wired or wireless connection between the test device and the receiving device to which test data is to be transmitted. For example, with respect to a wired connection, it may be technically challenging to connect an appropriate wire to a connection port of a test device and the receiving device to which test data is to be transmitted. For example, the receiving device may not include a complementary port for the wired connection. With respect to a wireless connection, it may be technically challenging to implement a wireless connection between a test device and a receiving device to which test data is to be transmitted. For example, in some cases, a test device and/or the receiving device to which test data is to be transmitted may not include a wireless connection capability. In other examples, test data transmitted via a wireless connection may be compromised by an unauthorized receiving device based on the utilization of the wireless connection. Yet further, in some examples, test data may not be accurately transmitted via a wireless connection due to intermittent loss of the wireless connection.

The systems, methods, and non-transitory computer readable media disclosed herein address at least the aforementioned technical challenges by formatting the test data in a QR code. A receiving device to which the test data is to be transmitted may scan the QR code to obtain the test data. The test data may be compressed and encrypted as disclosed herein for efficiency and security purposes.

For the systems, methods, and non-transitory computer readable media disclosed herein, the elements of the systems, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of a QR code based test data embedding and transmission system (hereinafter also referred to as "system 100") in accordance with an example of the present disclosure.

Referring to FIG. 1, the system 100 may include a test data analyzer 102 that is executed by at least one hardware processor (e.g., the hardware processor 802 of FIG. 8, and/or the hardware processor 1004 of FIG. 10), to obtain test data 104 based on operation of a test device 106 to measure a parameter associated with an optical fiber 108. The test data analyzer 102 may generate, based on an analysis of the test data 104, a report 110 that includes the test data 104.

A QR code generator 112 that is executed by at least one hardware processor (e.g., the hardware processor 802 of FIG. 8, and/or the hardware processor 1004 of FIG. 10) may compress the report 110 that includes the test data 104 to generate a compressed report 114. The test data 104 may be compressed, for example, using "LZMA" (Lempel-Ziv-Markov) compression that provides for no data loss during the compression. The QR code generator 112 may generate, based on an analysis of the compressed report 114, a QR code 116 that includes the compressed report 114 embedded therein. Since the QR code 116 works with textual data, the compressed report 114 may be encoded in the QR code 116 by utilizing a Base64 encoding technique.

A display generator 118 that is executed by at least one hardware processor (e.g., the hardware processor 802 of FIG. 8, and/or the hardware processor 1004 of FIG. 10) may generate a display 120 of the QR code 116 that includes the compressed report 114.

According to examples disclosed herein, the test data 104 may be transmitted to a receiving device 122 based on a scan of the QR code 116 by the receiving device 122. In this regard, a camera of the receiving device 122 may be utilized to scan the QR code 116.

According to examples disclosed herein, the test device 106 may be a power meter to measure the parameter associated with the optical fiber 108.

According to examples disclosed herein, the test device 106 may include an optical time domain reflectometer (OTDR) to measure the parameter associated with the optical fiber 108.

According to examples disclosed herein, the report 110 may include a JavaScript Object Notation (JSON) report. Other types of reports may include .pdf, .txt, and other such report formats.

According to examples disclosed herein, the QR code generator 112 may compress the report 110 that includes the test data 104 to generate the compressed report 114 by formatting the report in a specified format for inclusion in the QR code 116.

According to examples disclosed herein, the QR code generator 112 may format the report 110 in the specified format for inclusion in the QR code 116 by compressing the report 110 from a specified number of bytes to a reduced number of bytes to generate the compressed report 114. For example, the report 110 may be compressed from a specified number of bytes (e.g., 5124 bytes) to a reduced number of bytes (e.g., 1390 bytes, based on LZMA compression) to generate the compressed report 114. The QR code generator 112 may convert the compressed report 114 to a specified base format to generate a converted report. For example, the QR code generator 112 may convert the compressed report 114 to a Base64 base format (e.g., 1881 bytes) to generate a converted report. Further, the QR code generator 112 may generate the QR code 116 (e.g., QR Code Version 40 (from 1852 to 4296 bytes)) based on the converted report.

According to examples disclosed herein, the QR code generator 112 may generate, based on the analysis of the compressed report 114, the QR code 116 that includes the compressed report 114 by encrypting the test data 104 in the compressed report 114, and generating, based on the analysis of the compressed report 114 that includes the encrypted test data, the QR code 116 that includes the compressed report 114. For example, the QR code generator 112 may utilize a symmetric key algorithm for encrypting the test data 104.

The system 100 (part of which may be implemented in the receiving device 122) may further include a QR code reader 124 that is executed by at least one hardware processor (e.g., similar to the hardware processor 802 of FIG. 8, and/or the hardware processor 1004 of FIG. 10) to read, from the test device 106, the QR code 116 displayed on the display 120 of the test device 106.

A test data extractor 126 that is executed by at least one hardware processor (e.g., similar to the hardware processor 802 of FIG. 8, and/or the hardware processor 1004 of FIG. 10) may extract, from the QR code 116, the test data 104 obtained by the test device 106 for measurement of a parameter associated with the optical fiber 108. For example, a camera of the receiving device 122 may be utilized to scan the QR code 116, and to read the textual information embedded in the QR code 116.

According to examples disclosed herein, the test data extractor 126 may extract, from the QR code 116, the test data 104 obtained by the test device 106 for measurement of the parameter associated with the optical fiber 108 by decompressing the test data 104 included in the QR code 116 to generate a decompressed report 128 that includes the test data 104.

According to examples disclosed herein, the test data extractor 126 may extract, from the QR code 116, the test data 104 obtained by the test device 106 for measurement of the parameter associated with the optical fiber 108 by decrypting the decompressed report to extract the test data 104 included in the QR code 116. In this regard, a symmetric key algorithm may be used to decrypt the data embedded in the QR code 116. Further, the decrypted data may be decoded by utilizing a Base64 decoding technique, and decompressed by utilizing a decompression technique, such as LZMA.

Operation of the system 100 is described in further detail with reference to FIGS. 1-7.

FIGS. 2-5 illustrate an example of operation of the system 100 in accordance with an example of the present disclosure.

Figure 2:
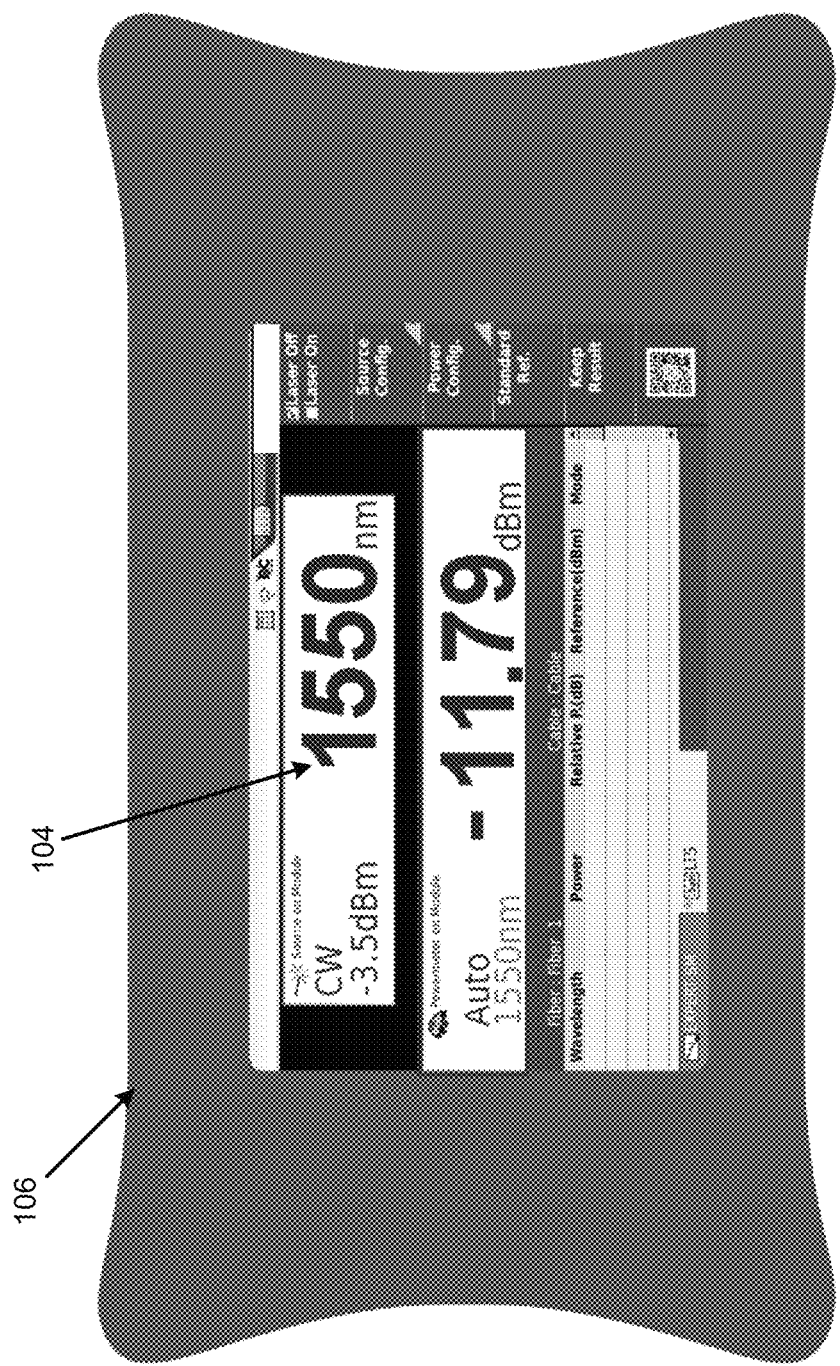
FIGS. 2-5 illustrate an example of operation of the QR code based test data embedding and transmission system of FIG. 1 in accordance with an example of the present disclosure.

Referring to FIG. 2, the test device 106 may measure a parameter associated with an optical fiber 108. For example, for a test device that includes a power meter, the parameter may include a wavelength (e.g., 1550 nm) and a noise (e.g., −11.79 dBm) associated with an optical fiber 108.

Figure 3:
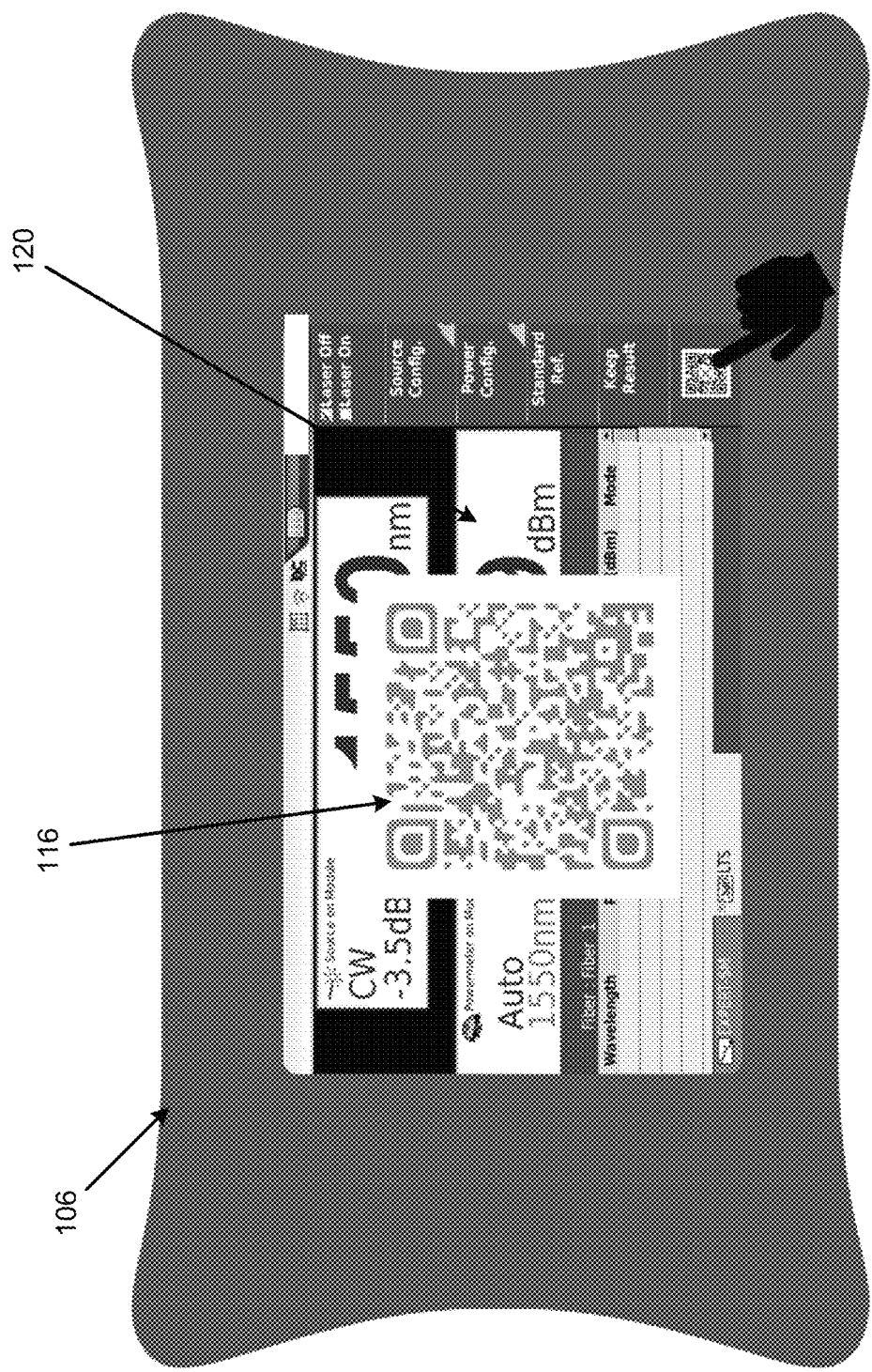

Referring to FIG. 3, the QR code generator 112 may compress the report 110 that includes the test data 104 to generate a compressed report 114. The QR code generator 112 may generate, based on an analysis of the compressed report 114, a QR code 116 that includes the compressed report 114. Further, the display generator 118 may generate a display 120 of the QR code 116 that includes the compressed report 114.

Figure 4:
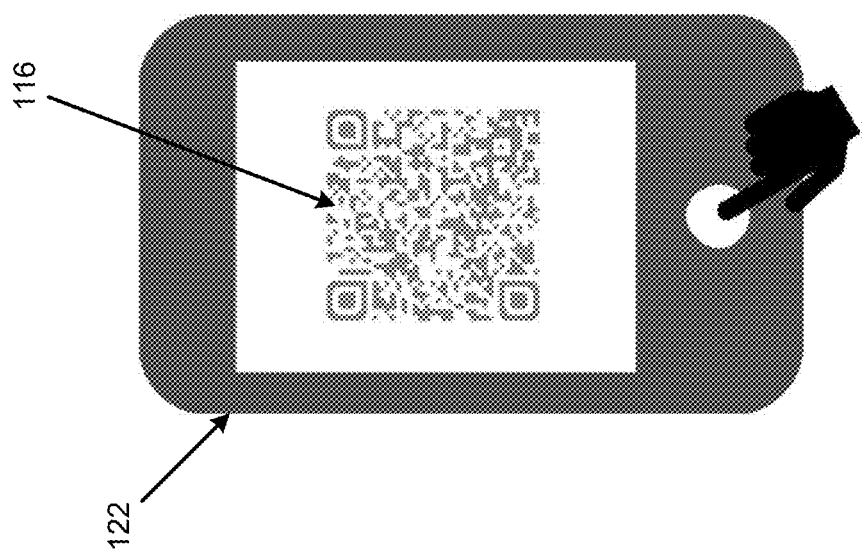

Referring to FIG. 4, with respect to the receiving device 122, the QR code reader 124 may read, from the test device 106, the QR code 116 displayed on the display 120 of the test device 106. For example, a specified application on the receiving device 122 may be invoked to read, from the test device 106, the QR code 116 displayed on the display 120 of the test device 106. In this regard, camera scanning or other such functionality of the receiving device 122 may be utilized to read the QR code 116.

Figure 5:
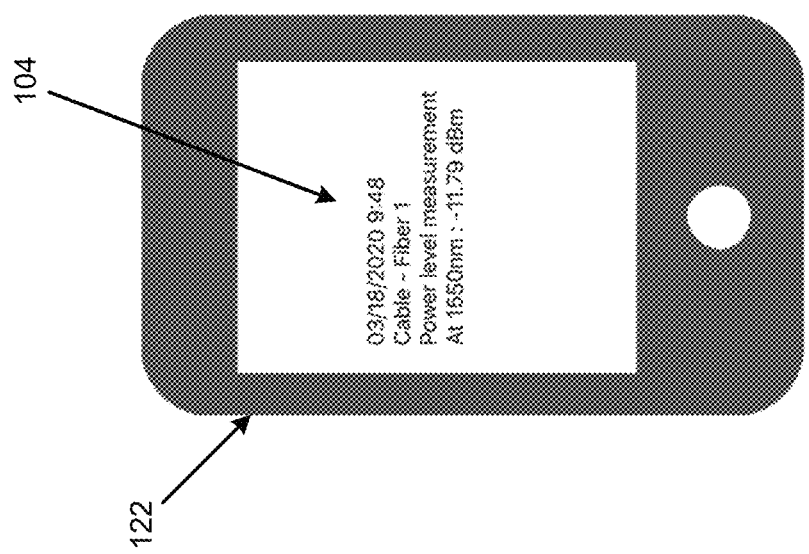

Referring to FIG. 5, the test data extractor 126 may extract, from the QR code 116, the test data 104 obtained by the test device 106 for measurement of a parameter associated with the optical fiber 108. For example, the specified application on the receiving device 122 that is invoked to read, from the test device 106, the QR code, may also be invoked to display the test data 104. In this regard, the specified application may also include functionality to forward the test data to another remote application, a cloud environment, or another such location, for example, in formats such as .pdf, .csv, .xml, .sor, etc.

Figure 6A:
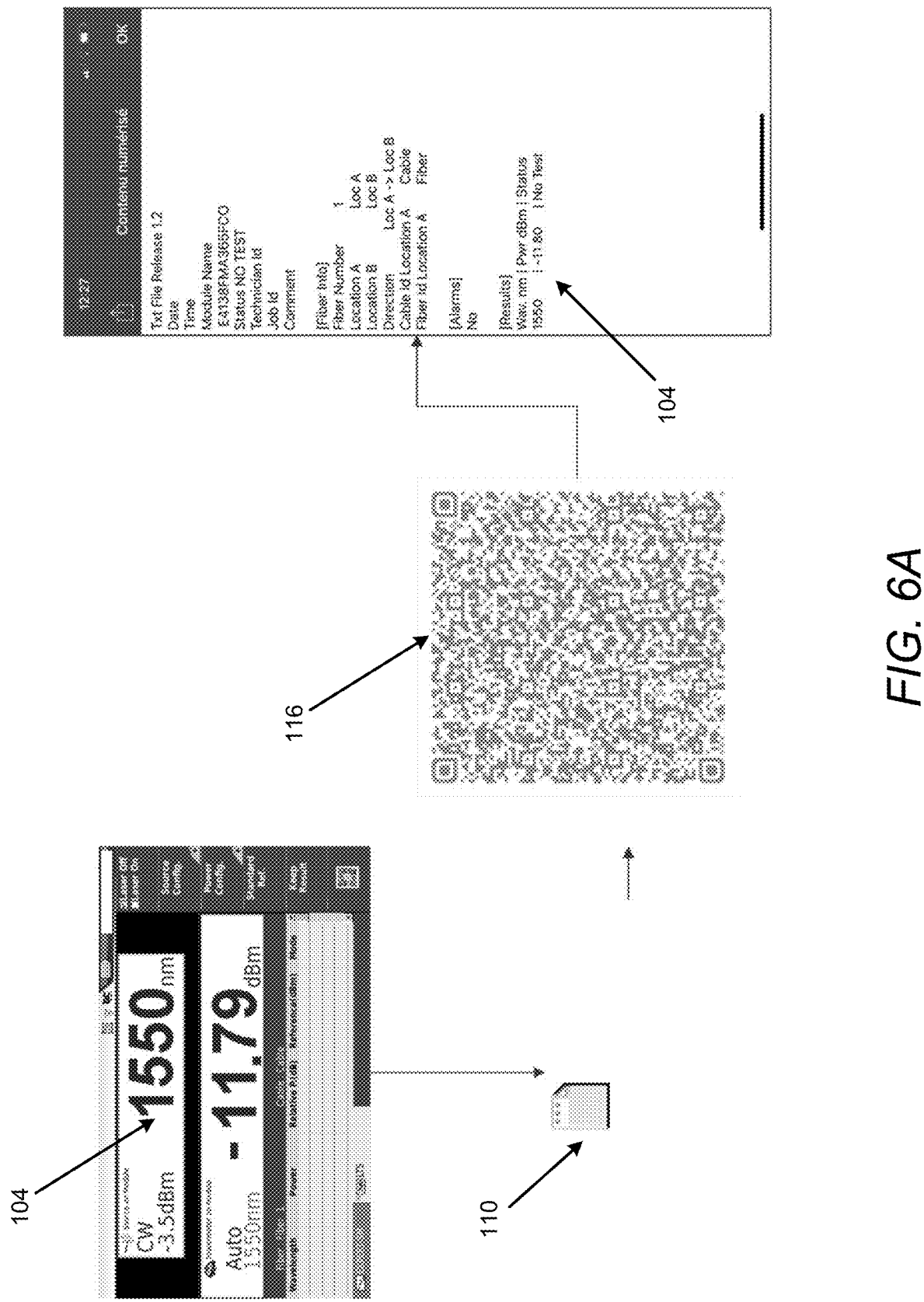

FIGS. 6A and 6B illustrate an example of operation of the system 100 for a power meter in accordance with an example of the present disclosure.

Referring to FIG. 6A, for the test device 106, which may be a power meter, the test data analyzer 102 may generate, based on an analysis of the test data 104, a report 110 that includes the test data 104. An example of the report 110 is shown in FIG. 6B. As shown in FIG. 6B, the report 110 may include values such as the test data 104 at 600, the optical fiber number at 602 for the optical fiber 108, etc.

Further, as shown in FIG. 6A, for the QR code 116, the test data extractor 126 may extract, from the QR code 116, the test data 104 obtained by the test device 106 for measurement of a parameter associated with the optical fiber 108.

Figure 7A:
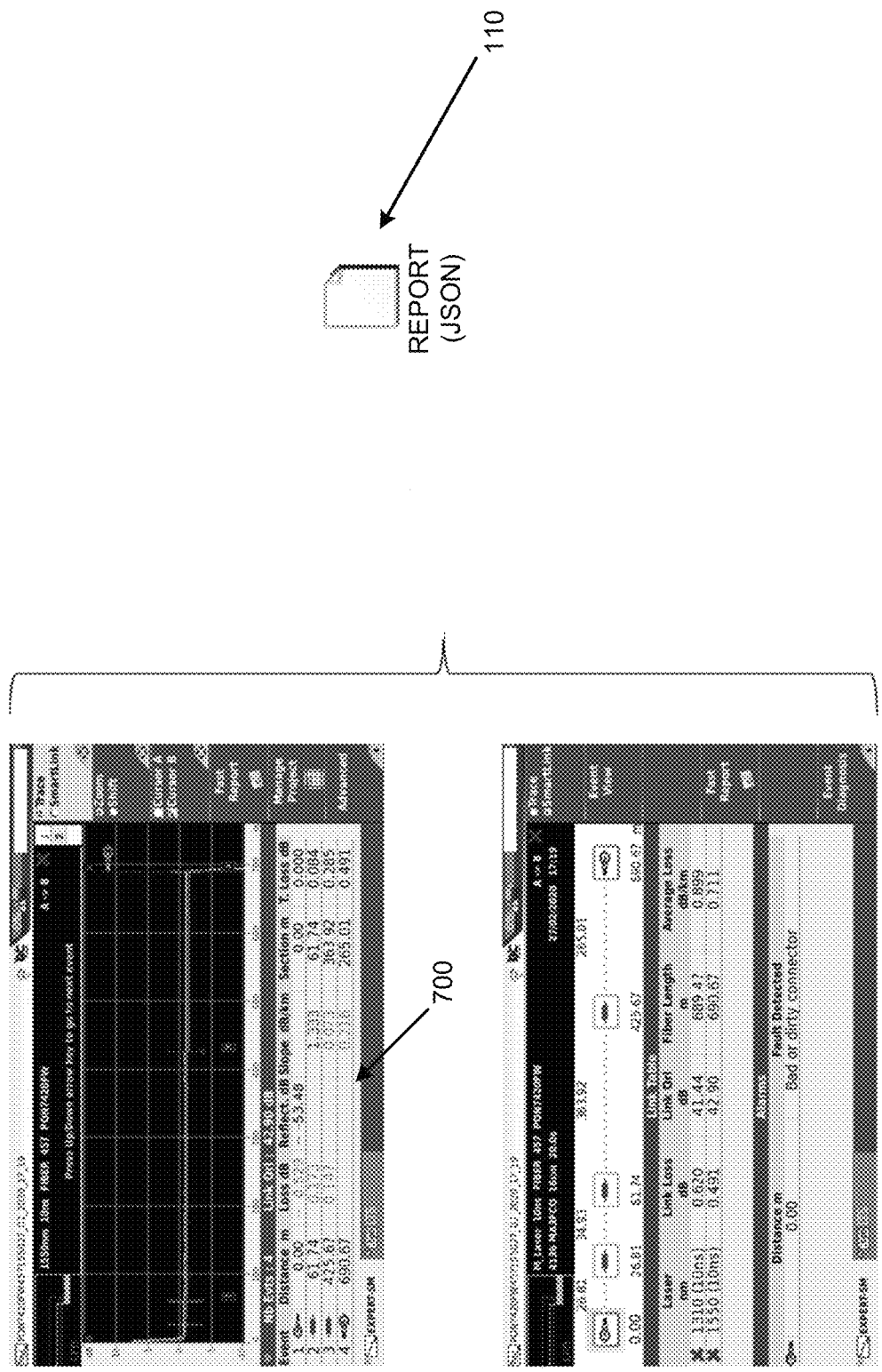
FIGS. 7A and 7B illustrate an example of operation of the QR code based test data embedding and transmission system of FIG. 1 for an OTDR in accordance with an example of the present disclosure.
Figure 7B:
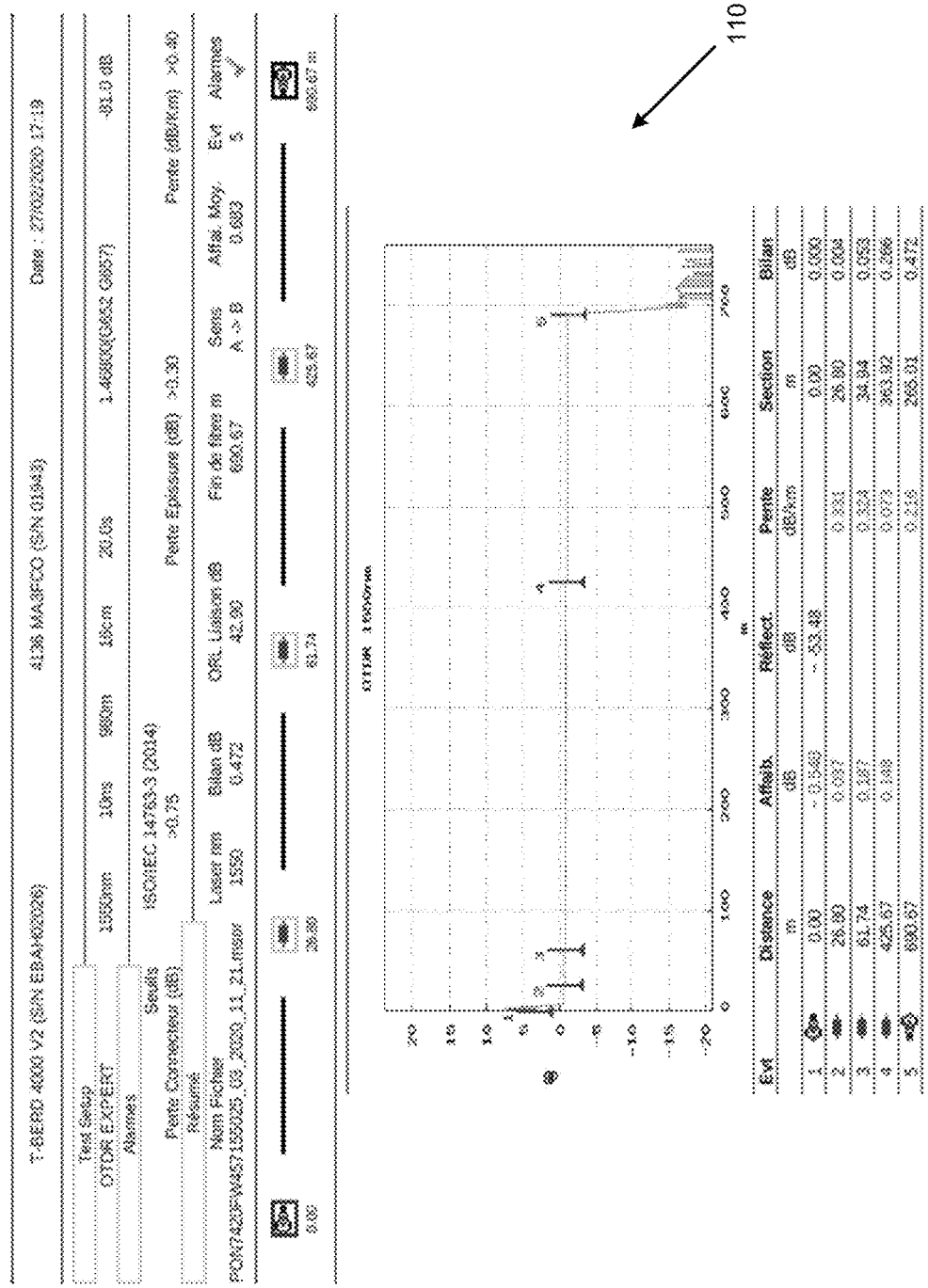

FIGS. 7A and 7B illustrate an example of operation of the system 100 for an OTDR in accordance with an example of the present disclosure.

Referring to FIG. 7A, the test device 106, which may be an OTDR, may measure parameters such as distance along the optical fiber, loss dB, reflectance dB, slope, etc., as shown at 700 with respect to an optical fiber. The test data analyzer 102 may generate, based on an analysis of the test data 104, a report 110 that includes the test data 104. An example of the report 110 is shown in FIG. 7B. The report 110 may include all relevant data to the measurement, such as, location information, file naming information, technician identifier, test data results for all passive optical elements such as splices, connectors, multiplexers, splitters, couplers, and impairments such as macro-bending for each measured signal and/or wavelengths. The metadata section may be used by a data management system.

In order to generate the QR code 116, the QR code generator 112 may compress the report 110 that includes the test data 104 to generate the compressed report 114. The QR code generator 112 may generate, based on an analysis of the compressed report 114, a QR code 116 that includes the compressed report 114. In this regard, the QR code generator 112 may compress the report 110 that includes the test data 104 to generate the compressed report 114 by formatting the report in a specified format (e.g., a .json file format) for inclusion in the QR code 116. For example, the QR code generator 112 may format the report 110 in the specified format for inclusion in the QR code 116 by compressing the report 110 (e.g., a .json report) from a specified number of bytes (e.g., 5124 bytes) to a reduced number of bytes (e.g., 1390 bytes) to generate the compressed report 114. The QR code generator 112 may convert the compressed report 114 to a specified base format (e.g., base64 (1881 bytes)) to generate a converted report. Further, the QR code generator 112 may generate the QR code 116 (e.g., QR Code Version 40 (from 1852 to 4296 bytes)) based on the converted report.

Figure 8:
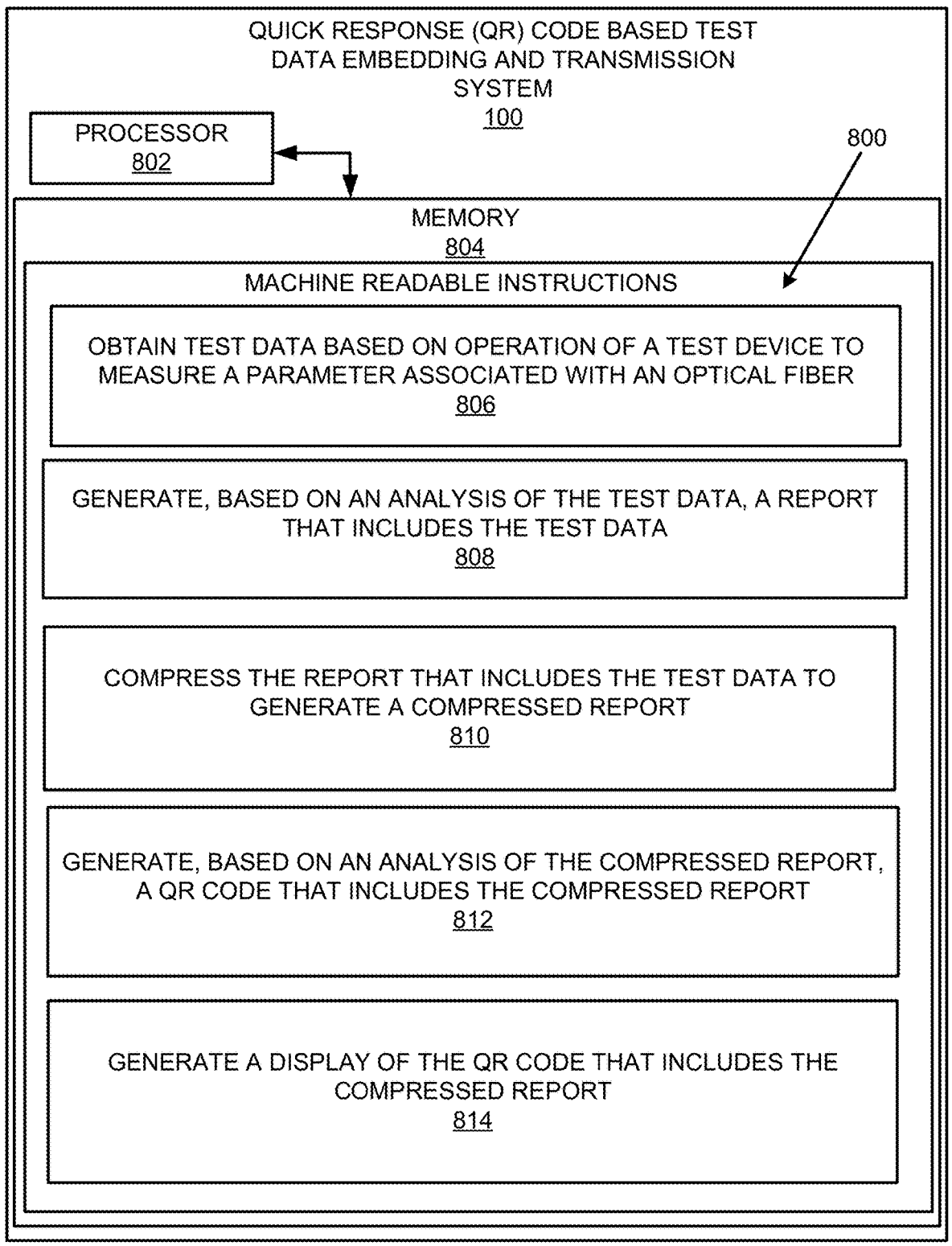
FIG. 8 illustrates an example block diagram for QR code based test data embedding and transmission in accordance with an example of the present disclosure.
Figure 10:
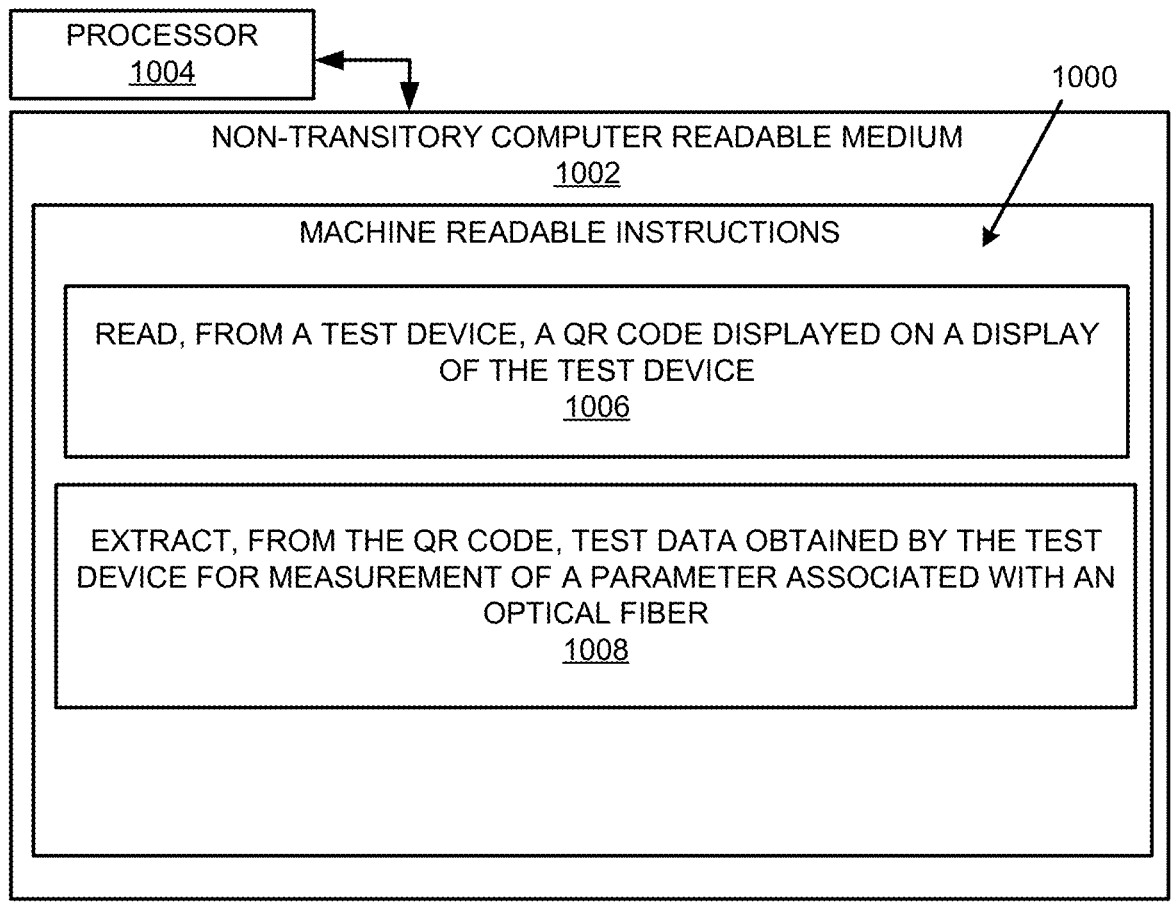
FIG. 10 illustrates a further example block diagram for QR code based test data embedding and transmission in accordance with another example of the present disclosure.

FIGS. 8-10 respectively illustrate an example block diagram 800, a flowchart of an example method 900, and a further example block diagram 1000 for QR code based test data embedding and transmission, according to examples. The block diagram 800, the method 90, and the block diagram 1000 may be implemented on the system 100 described above with reference to FIG. 1 by way of example and not of limitation. The block diagram 800, the method 900, and the block diagram 1000 may be practiced in other systems. In addition to showing the block diagram 800, FIG. 8 shows hardware of the system 100 that may execute the instructions of the block diagram 800. The hardware may include a processor 802, and a memory 804 storing machine readable instructions that when executed by the processor cause the processor to perform the instructions of the block diagram 800. The memory 804 may represent a non-transitory computer readable medium. FIG. 9 may represent an example method for QR code based test data embedding and transmission, and the steps of the method. FIG. 10 may represent a non-transitory computer readable medium 1002 having stored thereon machine readable instructions to provide QR code based test data embedding and transmission according to an example. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to obtain test data 104 based on operation of a test device 106 to measure a parameter associated with an optical fiber 108.

The processor 802 may fetch, decode, and execute the instructions 808 to generate, based on an analysis of the test data 104, a report 110 that includes the test data 104.

The processor 802 may fetch, decode, and execute the instructions 810 to compress the report 110 that includes the test data 104 to generate a compressed report 114.

The processor 802 may fetch, decode, and execute the instructions 812 to generate, based on an analysis of the compressed report 114, a QR code 116 that includes the compressed report 114.

The processor 802 may fetch, decode, and execute the instructions 814 to generate a display 120 of the QR code 116 that includes the compressed report 114.

Referring to FIGS. 1-7 and 9, and particularly FIG. 9, for the method 900, at block 902, the method may include obtaining, by at least one hardware processor, test data 104 based on operation of a test device 106 to measure a parameter associated with an optical fiber 108.

At block 904, the method may include generating, by the at least one hardware processor, based on an analysis of the test data 104, a report 110 that includes the test data 104.

At block 906, the method may include generating, by the at least one hardware processor, based on an analysis of the report 110, a QR code 116 that includes the report 110.

At block 908, the method may include generating, by the at least one hardware processor, a display 120 of the QR code 116 that includes the report 110.

Referring to FIGS. 1-7 and 10, and particularly FIG. 10, for the block diagram 1000, the non-transitory computer readable medium 1002 may include instructions 1006 to read, from the test device 106, the QR code 116 displayed on the display 120 of the test device 106.

The processor 1004 may fetch, decode, and execute the instructions 1008 to extract, from the QR code 116, the test data 104 obtained by the test device 106 for measurement of a parameter associated with the optical fiber 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   a test data analyzer, executed by at least one hardware processor, to
      obtain data based on operation of a device, and
      generate, based on an analysis of the data, a report that includes the data; and
   a quick response (QR) code generator, executed by the at least one hardware processor, to
      compress the report that includes the data to generate a compressed report, and
      generate, based on an analysis of the compressed report, a QR code that includes the compressed report.

2. The system according to claim 1, further comprising: a display generator, executed by the at least one hardware processor, to generate a display of the QR code that includes the compressed report.

3. The system according to claim 1, wherein the data is transmitted to a receiving device based on a scan of the QR code by the receiving device.

4. The system according to claim 1,
   wherein the device is a power meter to measure a parameter associated with an optical fiber, or
   wherein the device is an optical time domain reflectometer (OTDR) to measure the parameter associated with the optical fiber.

5. The system according to claim 1, wherein the report includes a JavaScript Object Notation (JSON) report.

6. The system according to claim 1, wherein the QR code generator is executed by the at least one hardware processor to compress the report that includes the data to generate the compressed report by:
   formatting the report in a specified format for inclusion in the QR code.

7. The system according to claim 6, wherein the QR code generator is executed by the at least one hardware processor to format the report in the specified format for inclusion in the QR code by:
   compressing the report from a specified number of bytes to a reduced number of bytes to generate the compressed report;
   converting the compressed report to a specified base format to generate a converted report; and
   generating the QR code based on the converted report.

8. The system according to claim 1, wherein the QR code generator is executed by the at least one hardware processor to generate, based on the analysis of the compressed report, the QR code that includes the compressed report by:
   encrypting the data in the compressed report; and
   generating, based on the analysis of the compressed report that includes the encrypted data, the QR code that includes the compressed report.

9. A system comprising:
   a quick response (QR) code reader, executed by at least one hardware processor, to read a QR code on a display associated with a device; and
   a data extractor, executed by the at least one hardware processor, to extract, from the QR code, data obtained by the device by
      decompressing the data included in the QR code to generate a decompressed report that includes the data, and
      decrypting the decompressed report to extract the data included in the QR code.

10. The system according to claim 9, wherein the data extractor is executed by the at least one hardware processor to extract, from the QR code, the data obtained by the device for measurement of a parameter associated with an optical fiber.

11. The system according to claim 10, wherein the data extractor is executed by the at least one hardware processor to:
   execute a symmetric key algorithm to decrypt the decompressed report that includes encrypted data to extract the data included in the QR code.

12. A method comprising:
   obtaining, by at least one hardware processor, data based on operation of a device;
   generating, by the at least one hardware processor, based on an analysis of the data, a report that includes the data;

compressing, by the at least one hardware processor, the report that includes the data to generate a compressed report; and generating, by the at least one hardware processor, based on an analysis of the compressed report, a quick response (QR) code that includes the compressed report.

13. The method according to claim 12, further comprising:

generating, by the at least one hardware processor, a display of the QR code that includes the compressed report.

14. The method according to claim 12, wherein the data is transmitted to a receiving device based on a scan of the QR code by the receiving device.

15. The method according to claim 12, wherein the device is a power meter to measure a parameter associated with an optical fiber.

16. The method according to claim 12, wherein the device is an optical time domain reflectometer (OTDR) to measure a parameter associated with an optical fiber.

17. The method according to claim 12, wherein the report includes a Javascript Object Notation (JSON) report.

18. The method according to claim 13, wherein compressing, by the at least one hardware processor, the report that includes the data to generate the compressed report further comprises:

formatting, by the at least one hardware processor, the report in a specified format for inclusion in the QR code.

19. The method according to claim 18, wherein formatting, by the at least one hardware processor, the report in the specified format for inclusion in the QR code further comprises:

compressing the report from a specified number of bytes to a reduced number of bytes to generate a compressed report;

converting the compressed report to a specified base format to generate a converted report; and generating the QR code based on the converted report.

20. The method according to claim 12, wherein generating, by the at least one hardware processor, based on the analysis of the report, the QR code that includes the report further comprises:

encrypting, by the at least one hardware processor, the data in the report; and generating, by the at least one hardware processor, based on the analysis of the report that includes the encrypted data, the QR code that includes the report.

* * * * *